(12) United States Patent
Ramos et al.

(10) Patent No.: US 12,050,098 B2
(45) Date of Patent: Jul. 30, 2024

(54) SHAPE SENSING SYSTEM AND METHOD FOR ANTHROPOMORPHIC TEST DEVICES

(71) Applicant: Humanetics Innovative Solutions, Inc., Farmington Hills, MI (US)

(72) Inventors: Rogerio Tadeu Ramos, Eastleigh (GB); Christopher Emslie, Romsey (GB)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 366 days.

(21) Appl. No.: 17/432,241

(22) PCT Filed: Feb. 20, 2020

(86) PCT No.: PCT/US2020/019078
§ 371 (c)(1),
(2) Date: Aug. 19, 2021

(87) PCT Pub. No.: WO2020/172437
PCT Pub. Date: Aug. 27, 2020

(65) Prior Publication Data
US 2022/0252389 A1    Aug. 11, 2022

Related U.S. Application Data

(60) Provisional application No. 62/808,028, filed on Feb. 20, 2019.

(51) Int. Cl.
*G01D 5/353* (2006.01)
*G01B 11/24* (2006.01)
(Continued)

(52) U.S. Cl.
CPC ......... *G01B 11/24* (2013.01); *G01D 5/35316* (2013.01); *G02B 6/02042* (2013.01); *G02B 6/02128* (2013.01); *G09B 23/32* (2013.01)

(58) Field of Classification Search
CPC .. G01B 11/24; G01D 5/35316; G01D 5/3537; G01D 5/3538; G01D 5/35383;
(Continued)

(56) References Cited

U.S. PATENT DOCUMENTS 4,633,079 A    12/1986 Rieger
5,134,281 A    7/1992 Bryenton et al.
(Continued)

FOREIGN PATENT DOCUMENTS

CN    101036045 A    9/2007
CN    101151179 A    3/2008
(Continued)

OTHER PUBLICATIONS

English language abstract for CN 101491433 A extracted from espacenet.com database on Mar. 3, 2023, 2 pages.
(Continued)

*Primary Examiner* — Uzma Alam
*Assistant Examiner* — Jonathon Cook
(74) *Attorney, Agent, or Firm* — Howard & Howard Attorneys PLLC

(57) ABSTRACT

A shape sensing system for an anthropomorphic test device is disclosed that includes a plurality of body parts and at least one optical fiber that has a plurality of cores in a spaced and parallel relationship with one another that extend between ends of the optical fiber for sensing positions of the body parts. Each of the cores have a plurality of grating sensors disposed along a length thereof capable of determining a position and orientation of the body parts.

11 Claims, 6 Drawing Sheets

(51) Int. Cl.
*G02B 6/02* (2006.01)
*G09B 23/32* (2006.01)

(58) Field of Classification Search
CPC . G02B 6/02042; G02B 6/02128; G09B 23/32
See application file for complete search history.

(56) References Cited

U.S. PATENT DOCUMENTS

| | | |
|---|---|---|
| 5,502,301 A | 3/1996 | Lord |
| 5,701,370 A | 12/1997 | Muhs et al. |
| 6,016,709 A | 1/2000 | Carnicelli et al. |
| 6,127,672 A | 10/2000 | Danisch |
| 6,381,069 B1 | 4/2002 | Riant et al. |
| 6,471,710 B1 | 10/2002 | Bucholtz |
| 6,575,757 B1 | 6/2003 | Leight et al. |
| 6,668,105 B2 | 12/2003 | Chen et al. |
| 6,816,266 B2 | 11/2004 | Varshneya et al. |
| 7,027,672 B2 | 4/2006 | Tjin |
| 7,043,997 B2 | 5/2006 | Mattson et al. |
| 7,086,273 B2 | 8/2006 | Fipmyer |
| 7,091,472 B1 | 8/2006 | Millar |
| 7,508,530 B1 | 3/2009 | Handman |
| 7,649,628 B2 | 1/2010 | Wadman |
| 7,702,190 B2 | 4/2010 | Hao et al. |
| 7,775,316 B2 | 8/2010 | Hosokawa et al. |
| 8,009,946 B2 | 8/2011 | Xia et al. |
| 8,086,430 B2 | 12/2011 | Thomas |
| 8,213,760 B2 | 7/2012 | Rudenick et al. |
| 8,244,088 B2 | 8/2012 | Putnam et al. |
| 8,672,684 B2 | 3/2014 | Ray |
| 8,700,358 B1 | 4/2014 | Parker, Jr. |
| 8,746,076 B2 | 6/2014 | Rogge et al. |
| 8,805,128 B2 * | 8/2014 | Wild .................. G01K 11/3206 385/12 |
| 8,909,040 B1 | 12/2014 | Parker, Jr. et al. |
| 8,970,845 B1 | 3/2015 | Chan et al. |
| 9,025,158 B2 * | 5/2015 | Froggatt ............. G01B 11/161 356/478 |
| 9,031,368 B2 | 5/2015 | Hayashi |
| 9,335,482 B2 | 5/2016 | Hao et al. |
| 9,345,424 B2 | 5/2016 | Wang et al. |
| 9,355,575 B2 | 5/2016 | Wang |
| 9,360,635 B2 | 6/2016 | Barwicz et al. |
| 9,417,057 B2 | 8/2016 | 'T Hooft et al. |
| 9,459,164 B2 | 10/2016 | Arkwright et al. |
| 9,664,506 B2 | 5/2017 | Parker, Jr. et al. |
| 9,681,826 B2 | 6/2017 | Dunias et al. |
| 9,715,838 B2 | 7/2017 | Below et al. |
| 9,736,597 B1 | 8/2017 | Spiegelberg et al. |
| 10,946,827 B2 | 3/2021 | Yoshikawa |
| 2001/0019103 A1 | 9/2001 | Sugai et al. |
| 2003/0083844 A1 | 5/2003 | Reddi et al. |
| 2004/0178330 A1 | 9/2004 | Tarvin et al. |
| 2004/0234218 A1 | 11/2004 | Tao et al. |
| 2005/0126258 A1 | 6/2005 | Lipmyer |
| 2006/0171646 A1 | 8/2006 | Putnam et al. |
| 2006/0215971 A1 | 9/2006 | Ramos |
| 2007/0058163 A1 | 3/2007 | Handman |
| 2007/0065077 A1 | 3/2007 | Childers et al. |
| 2007/0189352 A1 | 8/2007 | Nagahama et al. |
| 2007/0201793 A1 | 8/2007 | Askins et al. |
| 2008/0234898 A1 | 9/2008 | Wiener |
| 2008/0285909 A1 | 11/2008 | Younge et al. |
| 2009/0123111 A1 | 5/2009 | Udd |
| 2009/0324161 A1 | 12/2009 | Prisco |
| 2011/0109898 A1 | 5/2011 | Froggatt et al. |
| 2011/0239731 A1 | 10/2011 | Lisseman et al. |
| 2011/0245733 A1 | 10/2011 | Goldbeck et al. |
| 2011/0249252 A1 | 10/2011 | Lantz et al. |
| 2012/0186369 A1 | 7/2012 | Matlschweiger |
| 2013/0090552 A1 | 4/2013 | Ramamurthy et al. |
| 2013/0301998 A1 | 11/2013 | Hayashi |
| 2013/0327164 A1 | 12/2013 | Wang |
| 2014/0053654 A1 | 2/2014 | Rogge et al. |
| 2014/0112615 A1 | 4/2014 | Kreger et al. |
| 2014/0326078 A1 | 11/2014 | Arkwright et al. |
| 2015/0029511 A1 | 1/2015 | 'T Hooft et al. |
| 2015/0124266 A1 | 5/2015 | Davis et al. |
| 2015/0230730 A1 | 8/2015 | Sabczynski et al. |
| 2017/0162077 A1 | 6/2017 | Vara et al. |
| 2017/0196479 A1 | 7/2017 | Liu et al. |
| 2017/0205291 A1 | 7/2017 | Shimada |
| 2017/0205297 A1 | 7/2017 | Rickman et al. |
| 2017/0354353 A1 | 12/2017 | Kim et al. |
| 2018/0033339 A1 | 2/2018 | Kerins et al. |
| 2018/0128600 A1 | 5/2018 | 'T Hooft |
| 2018/0160947 A1 | 6/2018 | Hu |
| 2018/0297214 A1 | 10/2018 | Lessing et al. |
| 2019/0017887 A1 | 1/2019 | Bovero et al. |
| 2019/0094459 A1 | 3/2019 | Froggatt et al. |
| 2020/0348193 A1 | 11/2020 | Vara et al. |
| 2022/0252389 A1 | 8/2022 | Ramos et al. |

FOREIGN PATENT DOCUMENTS

| | | |
|---|---|---|
| CN | 101491433 A | 7/2009 |
| CN | 202582783 U | 12/2012 |
| CN | 103170978 A | 6/2013 |
| CN | 103673791 A | 3/2014 |
| CN | 103674083 A | 3/2014 |
| CN | 104169678 A | 11/2014 |
| CN | 104236627 A | 12/2014 |
| CN | 104321673 A | 1/2015 |
| CN | 104736054 A | 6/2015 |
| CN | 104833525 A | 8/2015 |
| CN | 105136338 A | 12/2015 |
| CN | 105571620 A | 5/2016 |
| CN | 105755950 A | 7/2016 |
| CN | 106959077 A | 7/2017 |
| CN | 107015653 A | 8/2017 |
| CN | 107036543 A | 8/2017 |
| CN | 107249833 A | 10/2017 |
| CN | 108852361 A | 11/2018 |
| CN | 106610273 B | 3/2019 |
| DE | 19532945 A1 | 3/1996 |
| DE | 10215640 A1 | 11/2003 |
| DE | 10333735 A1 | 3/2005 |
| DE | 102013009815 A1 | 12/2013 |
| DE | 102013101432 A1 | 8/2014 |
| EP | 1710129 A2 | 10/2006 |
| EP | 2467692 A2 | 6/2012 |
| EP | 2245438 B1 | 4/2013 |
| EP | 2626006 A2 | 8/2013 |
| WO | 00068645 A1 | 11/2000 |
| WO | 2009061181 A1 | 5/2009 |
| WO | 2011066926 A1 | 6/2011 |
| WO | 2014101754 A1 | 7/2014 |
| WO | 2017118949 A1 | 7/2017 |
| WO | 2019147754 A1 | 8/2019 |
| WO | 2019147754 A4 | 10/2019 |

OTHER PUBLICATIONS

English language abstract for CN 104169678 A extracted from espacenet.com database on Mar. 3, 2023, 1 page.
English language abstract for CN 104736054 A extracted from espacenet.com database on Mar. 3, 2023, 2 pages.
English language abstract for CN 107015653 A extracted from espacenet.com database on Mar. 3, 2023, 1 page.
English language abstract for CN 108852361 A extracted from espacenet.com database on Mar. 3, 2023, 1 page.
English language abstract for DE 10 2013 101 432 A1 extracted from espacenet.com database on Mar. 9, 2023, 1 page.
Chinese Search Report for Application CN 2020800285226 dated Feb. 2, 2023, 3 pages.
Chinese Search Report for Application CN 2020800286017 dated Feb. 18, 2023, 3 pages.
Amanzadeh, Moe et al., "Recent Developments in Fibre Optic Shape Sensing", Measurement, vol. 128, Nov. 2018, pp. 119-137.
European Search Report for Application EP 20 75 9871 dated Sep. 27, 2022, 2 pages.

(56) References Cited

OTHER PUBLICATIONS

European Search Report for Application EP 20 75 9172 dated Oct. 7, 2022, 2 pages.
Chinese Search Report for Application CN 2019800189673 dated Nov. 1, 2021, 2 pages.
English language abstract for CN 101036045 A extracted from espacenet.com database on Nov. 4, 2021, 2 pages.
English language abstract for CN 105136338 A extracted from espacenet.com database on Nov. 4, 2021, 1 page.
English language abstract for CN 107036543 A extracted from espacenet.com database on Nov. 4, 2021, 1 page.
English language abstract for DE 103 33 735 A1 extracted from espacenet.com database on Nov. 9, 2022, 1 page.
English Translation of German Office Action for Application DE 10 2013 009 815.7 dated Jun. 13, 2022, 16 pages.
Chinese Search Report for Application CN 2020800285974 dated Apr. 3, 2023, 3 pages.
English language abstract and original document of HU, Wenshan, "Progress in the Research on Robot's Sensitive Skin", Journal of Hefei University of Technology, Dec. 3, 2006, 4 Pages.
English language abstract and original document of Wang, Yan, "Dynamic Testing Based on FBG and Its Preliminary Application in the Artificial Skin", China Master's Theses, Information Technology Series, Feb. 1, 2016, 75 pages.
Chinese Search Report for Application CN 202080028597.4 dated Oct. 20, 2022, 2 pages.
English language abstract for CN 101151179 A extracted from espacenet.com database on Nov. 23, 2022, 2 pages.
English language abstract for CN 104321673 A extracted from espacenet.com database on Nov. 23, 2022, 2 pages.
English language abstract for CN 105571620 A extracted from espacenet.com database on Nov. 23, 2022, 2 pages.
English language abstract for CN 106959077 A extracted from espacenet.com database on Nov. 23, 2022, 1 page.
English language abstract for CN 107249833 A extracted from espacenet.com database on Nov. 23, 2022, 2 pages.
Butz, Robert C. et al., "In-Fiber Bragg Grating Impact Force Transducer for Studying Head-Helmet Mechanical Interaction in Head Impact", Journal of Lightwave Technology, vol. 33, No. 13, Jul. 1, 2015, 8 pages.
Di Sante, Raffaella, "Fibre Optic Sensors for Structural Health Monitoring of Aircraft Composite Structures: Recent Advances and Applications", Sensors, vol. 15, Jul. 30, 2015, pp. 18666-18713.
English language abstract for CN 104833525 A extracted from espacenet.com database on Oct. 8, 2020, 1 page.
English language abstract for CN 106610273 B extracted from espacenet.com database on Oct. 8, 2020, 1 page.
English language abstract for CN 202582783 U extracted from espacenet.com database on Oct. 8, 2020, 1 page.
English language abstract for DE 102 15 640 A1 extracted from espacenet.com database on Oct. 11, 2021, 1 page.
English language abstract for DE 195 32 945 A1 extracted from espacenet.com database on Aug. 20, 2020, 1 page.
English language abstract for WO 2014/101754 A1 extracted from espacenet.com database on Sep. 1, 2021, 2 pages.
English language abstract not found for DE 10 2013 009 815 A1; however, see English language equivalent U.S. Pat. No. 9,355,575 B2. Original document extracted from espacenet.com database on Oct. 11, 2021, 11 pages.
European Search Report for Application EP 19 74 3262 dated Sep. 2, 2021, 2 pages.
HBM, "How Does An Optical Strain Guage Work?", 2018, 6 pages.
International Search Report for Application No. PCT/US2019/014878 dated Jun. 20, 2019, 1 page.
International Search Report for Application No. PCT/US2020/019042 dated May 11, 2020, 1 page.
International Search Report for Application No. PCT/US2020/019048 dated May 11, 2020, 1 page.
International Search Report for Application No. PCT/US2020/019078 dated May 5, 2020, 1 page.
Moore, Jason P. et al., "Shape Sensing Using Multi-Core Fiber Optic Cable and Parametric Curve Solutions", Optical Society of America, 2012, 7 pages.
Prosser, W.H. et al., "Structural Health Management for Future Aerospace Vehicles", https://ntrs.nasa.gov/search.isp?R=20040200975, 2004, 16 pages.
Reddy, M et al., "Imbedded Optical Fiber Sensor of Differential Strain in Composites", 1987, pp. 1241-1245.
Richards, Lance et al., "NASA Applications of Structural Health Monitoring Technology", Sep. 2013, 42 pages.
Talaia, Perdro Miguel de Almeida, "Motorcyclist Biomechanical Model", 2013, 249 pages.
Udd, Eric, "25 Years of Structural Monitoring Using Fiber Optic Sensors", Apr. 15, 2011, 9 pages.
U.S. Appl. No. 16/964,489, filed Jul. 23, 2020.
U.S. Appl. No. 17/432,226, filed Aug. 19, 2021.
U.S. Appl. No. 17/432,263, filed Aug. 19, 2021.
Westbrook, P.S. et al., "Distributed Sensing Over Meter Lengths Using Twisted Multicore Optical Fiber With Continuous Bragg Gratings", 2017, 9 pages.
Yu, Henry Y. et al., "A Test Bed to Examine Helmet Fit and Retention and Biomechanical Measures of Head and Neck Injury in Simulated Impact", Journal of Visualized Experiments, Issue 127, Sep. 21, 2017, 18 pages.
Chinese Search Report for Application CN 2020800286017 dated Sep. 16, 2023, 3 pages.
Chinese Search Report for Application CN 2019800189673 dated Jan. 10, 2023, 2 pages.
English language abstract for CN 103673791 A extracted from espacenet.com database on Feb. 2, 2023, 2 pages.
English language abstract for CN 103674083 A extracted from espacenet.com database on Feb. 2, 2023, 2 pages.
English language abstract for CN 104236627 A extracted from espacenet.com database on Feb. 2, 2023, 2 pages.
English language abstract for CN 105755950 A extracted from espacenet.com database on Feb. 2, 2023, 2 pages.
Kroell, Charles K. et al., "Impact Tolerance and Response of the Human Thorax", Research Laboratories, General Motors Corp., SAE International, vol. 83, Section 4, 1974, pp. 84-134.
Parent, Daniel et al., "Biofidelity Evaluation of the THOR and Hybrid III 50th Percentil Male Frontal Impact Anthropomorphic Test Devices", Stapp Car Crash Journal, vol. 61, Nov. 2017, pp. 227-276.
Rupp, Jonathan D. et al., "Characterization of Knee-Thigh-Hip Response in Frontal Impacts Using Biomechanical Testingand Computational Simulations", Stapp Car Crash Journal, vol. 52, Nov. 2008, pp. 421-474.
Chinese Search Report for Application CN 2020800286017 dated Apr. 2, 2024, 2 pages.
English language abstract for CN 103170978 A extracted from espacenet.com database on Apr. 22, 2024, 1 page.

* cited by examiner

SHAPE SENSING SYSTEM AND METHOD FOR ANTHROPOMORPHIC TEST DEVICES

RELATED APPLICATIONS

This application claims priority to U.S. Provisional Patent Application No. 62/808,028, filed on Feb. 20, 2019, which is hereby incorporated by reference.

BACKGROUND

1. Field of the Invention

The present invention relates generally to anthropomorphic test devices and, more particularly, to a shape sensing system for an anthropomorphic test device.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic test devices (ATD), commonly referred to as "crash test dummies." During collision testing, the ATD is placed inside a vehicle and the vehicle undergoes a simulated collision (sled test) or physical collision. The collision exposes the ATD to high inertial loading, and sensors inside the ATD, such as accelerometers, strain gauges, and other sensors, generate electrical signals of data corresponding to the loading. Cables transmit these electrical signals of data to a data acquisition system (DAS) for subsequent processing. This data reveals information about the effects of the collision on the anthropomorphic test device and can be correlated to the effects a similar collision would have on a human occupant.

The movement and distortions of the ATD during a crash test have also been monitored visually using high speed cameras in the past. However, some tests cannot be monitored in this way because of the construction of the structure surrounding the ATD, the presence of other dummies, or the inflation of air bags. Also, the position or shape of individual parts of the ATD may be difficult to estimate, such as limbs and internal organs. Simulated soft organs are particularly difficult to monitor using traditional strain gauges where it is difficult to measure strain of low Young modulus materials using high Young modulus sensing elements.

The ATD is highly adjustable to allow for many different configurations. Thus, it is difficult to reposition the ATD into precisely the same position and orientation for subsequent tests. Cameras can be used to realign the ATD, but there is less certainty that the position and orientation is the same. If the position and orientation of the ATD differs between subsequent tests, the results may differ.

SUMMARY

Accordingly, the present invention provides a system for sensing a shape of an anthropomorphic test device. The system comprises a plurality of body parts forming the anthropomorphic test device and the ATD simulates at least a part of a human body. At least one optical fiber is supported by at least one of the body parts with the optical fiber extending between a first end and a second end. The at least one optical fiber has a plurality of cores extending between the first and the second ends and the cores are in a spaced and parallel relationship with one another between the first and the second ends. Each of the cores has a plurality of grating sensors inscribed integrally therein with the sensors spaced along a length between the first and the second ends. The grating sensors reflect an initial instance of light having a predetermined band of wavelengths as a first reflection. The first reflection corresponds to an initial position and orientation of the body parts prior to undergoing movement of the plurality of body parts. After the body parts are moved from the initial position and orientation, the grating sensors reflect a second instance of light as a second reflection. The second reflection corresponds to a reposition and reorientation of the body parts to compare to the first reflection of the initial position and orientation.

The present invention further provides a method for repeatably positioning an anthropomorphic test device by disposing at least one optical fiber throughout a plurality of body parts forming the anthropomorphic test device. The optical fiber has a plurality of cores extending between a first end and a second end with each of the cores being in a spaced and parallel relationship with one another. Each of the cores has a plurality of grating sensors inscribed integrally therein with the sensors spaced along a length between the first and the second ends. The anthropomorphic test device is positioned in an initial position and orientation of the body parts and an initial instance of a light is emitted through the cores of the optical fibers. An initial reflected light of the initial instance of the light from the sensors is detected that corresponds to the initial position and orientation. Next, the anthropomorphic test device is subjected to a sudden impact causing the body parts to move from the initial position and orientation. Then, the anthropomorphic test device is repositioned with the at least one optical fiber disposed thereabout and a second instance of a light is emitted through the cores of the optical fibers. A second reflected light of the second instance of the light from the sensors is detected and the anthropomorphic test device is continued to be repositioned and reoriented until the second reflection correlates with the initial reflection such that the position and orientation of the anthropomorphic test device corresponds to the initial position and orientation.

One advantage of the present invention is that a new shape sensing system is provided for an anthropomorphic test device. The shape sensing systems utilizes an optical fiber that is positioned throughout the ATD. The optical fiber is also small and lightweight minimizing interference with the test. The optical fibers are typically formed of a silica based fiber which is very stable and provides repeatable test results. The use of optical fiber as sensing elements has also the advantage of having the electronics remote from the location of sensing. Another advantage is that the optical fiber is insensitive to electromagnetic noise in the environment.

The subject invention allows the ATDs to be used in tests other than a crash or collision test, including the drops, parachuting, spacecraft launches, etc., that require precise positioning of the ATD before the test and subsequent tests to ensure repeatability of the test and accuracy of the test results. The precise positioning is aided by the plurality of cores, which provides additional positional data for the various body parts. The plurality of cores also increases the sensitivity of the optical fiber and the system as a whole.

Other features and advantages of the present invention will be readily appreciated, as the same becomes better understood, after reading the subsequent description taken in conjunction with the accompanying drawings.

DETAILED DESCRIPTION

Figure 1:
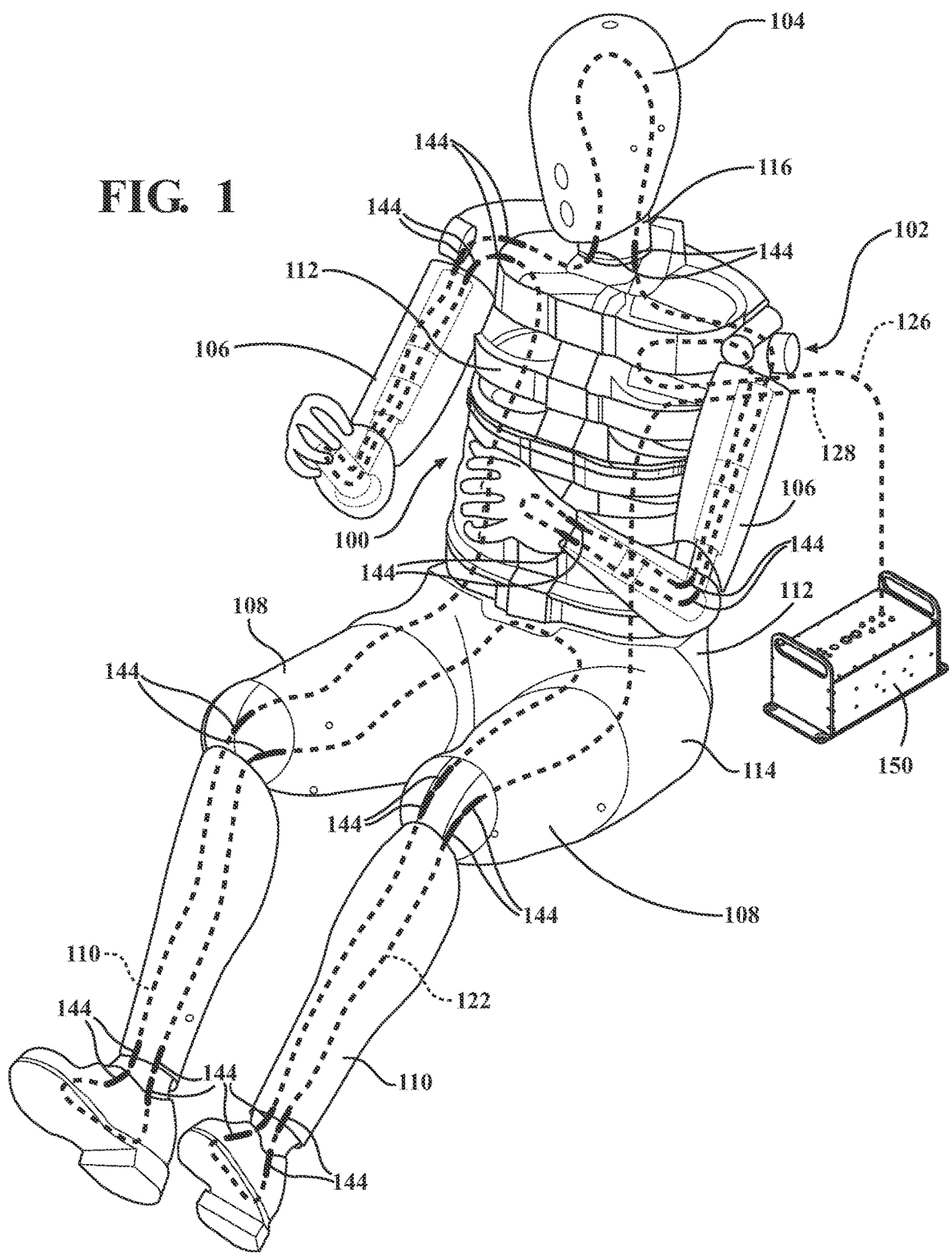
FIG. 1 is a perspective view of one embodiment of a shape sensing system, according to the present invention, having a plurality of body parts forming an anthropomorphic test device with at least one optical fiber supported thereon.
Figure 2:
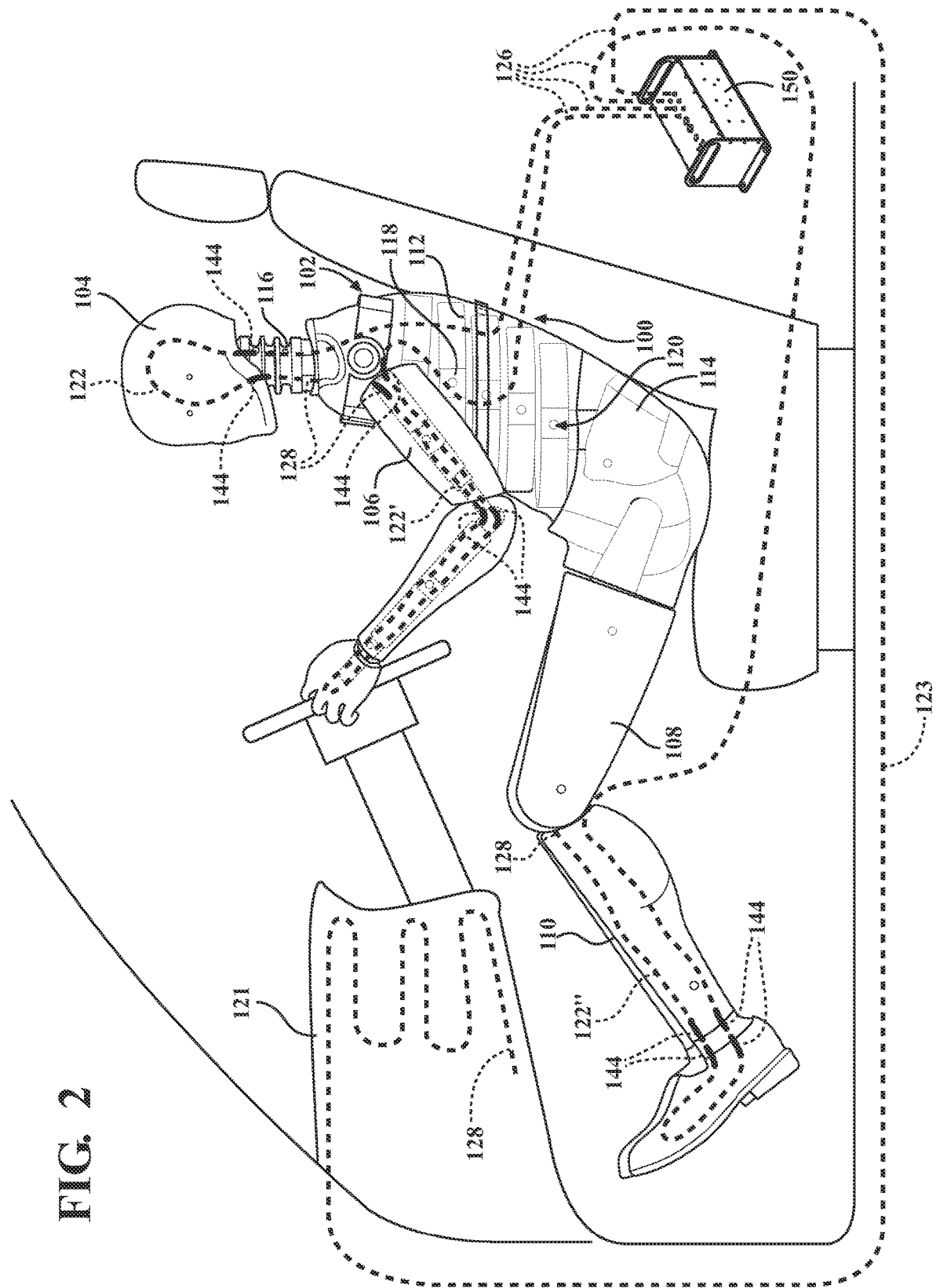
FIG. 2 is a side view of the shape sensing system illustrated in FIG. 1.

Referring to the drawings and in particular FIGS. 1 and 2, one embodiment of a shape sensing system 100, according to the present invention, is shown in operational relationship with an anthropomorphic test device (ATD), generally indicated at 102. The anthropomorphic test device 102, in the example shown, is of a fiftieth percentile (50%) male type and is illustrated in a sitting position. It should be appreciated that the shape sensing system 100 would apply to all types of ATD 102. The sensing system 100 can be used to sense shape or position of the ATD 102 or part of an ATD 102 such that the position can be maintained or precisely realigned for subsequent tests.

In one embodiment, the system 100 is used primarily, but without limitation, to test the performance of interiors and systems for seat occupants that undergo an impact or a crash. In another embodiment, the system 100 can be used to test a plurality of components forming a part of at least one of a vehicle and a testing stand. This can also include specifically testing the performance of automotive interiors and restraint systems for adult front and rear seat occupants. Referring to automotive interior components, this may include seats, restraints, consoles, steering columns, steering wheels or any interior component subject to impact. Other vehicles that can be tested include, but are not limited to, airplanes and the associated interior components, which may include seats, restraints, hull, head liners, seat trays and the like.

The size and weight of the ATD 102 is based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. The ATD 102 can also be used to test the force of impacts on a simulated human body directly in various testing stands, such as neck twist fixtures, chest impact fixtures, and the like. The ATD 102 can also be used to test the force of impacts on a simulated human body directly in various testing stands or test fixtures, such as neck twist fixtures, chest impact fixtures, and the like. Test fixtures can also include various parts of the vehicle. Similarly, the optical fiber 122 can be supported by and in contact with such testing stands to test impacts thereon.

The system 100 includes a plurality of body parts forming the anthropomorphic test device and simulates at least a part of a human body and articulation thereof. The body parts typically include a rigid body part and a flexible body part. Rigid body parts of the ATD 102 are meant to mimic and/or simulate rigid body parts of a human body, such as bone. Flexible body parts are meant to mimic and/or simulate flexible body parts of the human body, such as flesh, muscle, tissue, organs, and the like. The ATD 102 combines rigid and flexible body parts to more accurately represent the human body. For example, an arm assembly includes the rigid body part corresponding to the bones and the flexible body part corresponding to the flesh, muscle, and tissue. Referring to the flexible body parts, it should be appreciated that various materials, such as a urethane or plastic can be used to form the flexible body parts for improved coupling with the rigid body parts of the anthropomorphic test device.

As shown generally in FIG. 1, the ATD 102 includes a head assembly 104, a right and left arm assembly 106, a right and left upper leg assembly 108, a right and left lower leg assembly 110, a thorax assembly 112, and a pelvis assembly 114. An instrumentation core may be mounted within the various body parts and may be removable for access to the body part. It should be appreciated that the right and left assemblies are generally constructed in a similar manner. It is to be appreciated by one of ordinary skill in the art that the individual components forming the ATD 102 are well known and can be varied based on the particular ATD 102 without deviating from the subject invention.

FIG. 2 shows a neck assembly 116 that connects the head assembly 104 to the thorax assembly 112. The thorax assembly 112 also includes a spine assembly 118 having an upper end mounted to the head assembly 104 and a lower end extending into a torso area of the ATD 102. The thorax assembly 112 also includes a rib cage assembly 120 connected to the spine assembly 118.

Figure 3:
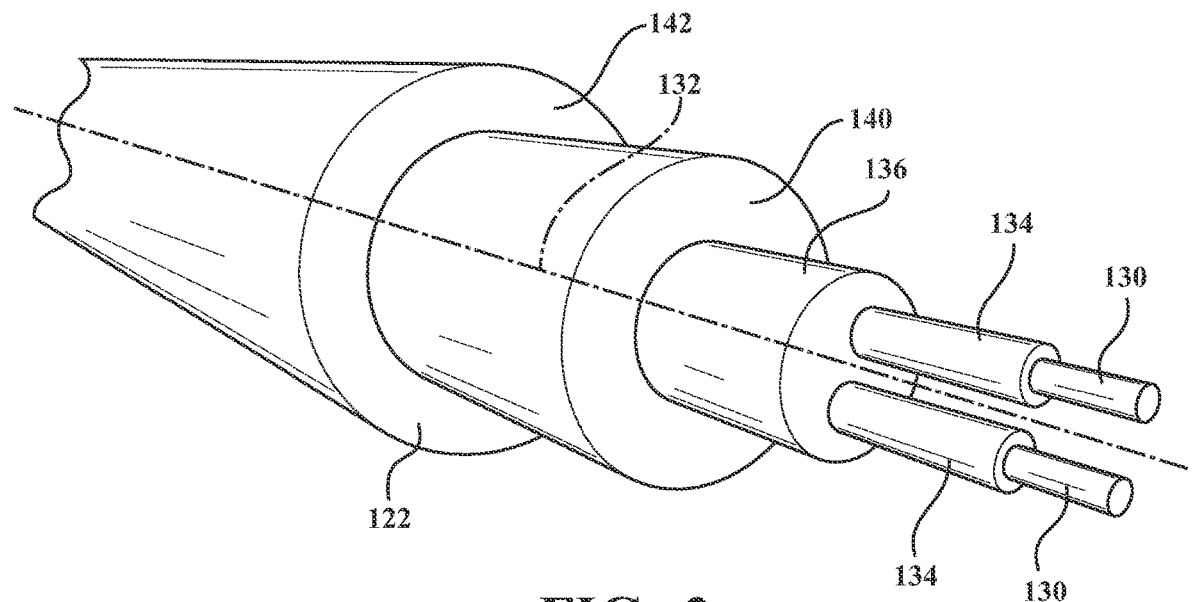
FIG. 3 is a partial cut away, perspective view of an optical fiber for use in the shape sensing system of the subject invention.

Referring again to FIGS. 1 and 2, the shape sensing system 100, according to the present invention, includes at least one optical fiber 122 extending between first and second end 126, 128 and throughout the ATD 102. Yet another optical fiber 123 is disposed in the interior component, such as a dashboard 121. Referring to FIG. 3, the optical fiber 122 has a plurality of cores 130, i.e. multiple cores 130 that extend between the first and the second end 126, 128 and are in a spaced and parallel relationship with one another. The optical fiber 122 further defines a longitudinally extending, fiber axis 132. The plurality of cores 130 may include one core located along the fiber axis, such as a central core, and other cores spaced from the central core, such as satellite cores. Alternatively, the plurality of cores 130 could include only the satellite cores. The optical fiber 122 may mount directly to a surface of the body part or is embedded within the body part. It is to be appreciated that mounting can be achieved with adhesive, glue, tape, or the like. It is to be appreciated that embedding the optical fiber can be achieved by various methods as such as by molding or casting the body part around the optical fiber. It is also possible that the body part could be 3D printed about the optical fiber or vice versa.

In this embodiment, each core 130 is surrounded by a cladding material 134 and two cores 130 extend parallel to one another and are spaced from the fiber axis 132. A coating material 136 surrounds the cladding material 134 to provide strength to the core 130 and cladding material 134. Optimally, although not necessarily, a strength member 140 and an outer jacket 142 may also surround the coating material 136 to provide additional strength to the optical fiber 122. However, it is to be appreciated that the various layers may depend on the configuration of the plurality of cores 130.

Figure 4:
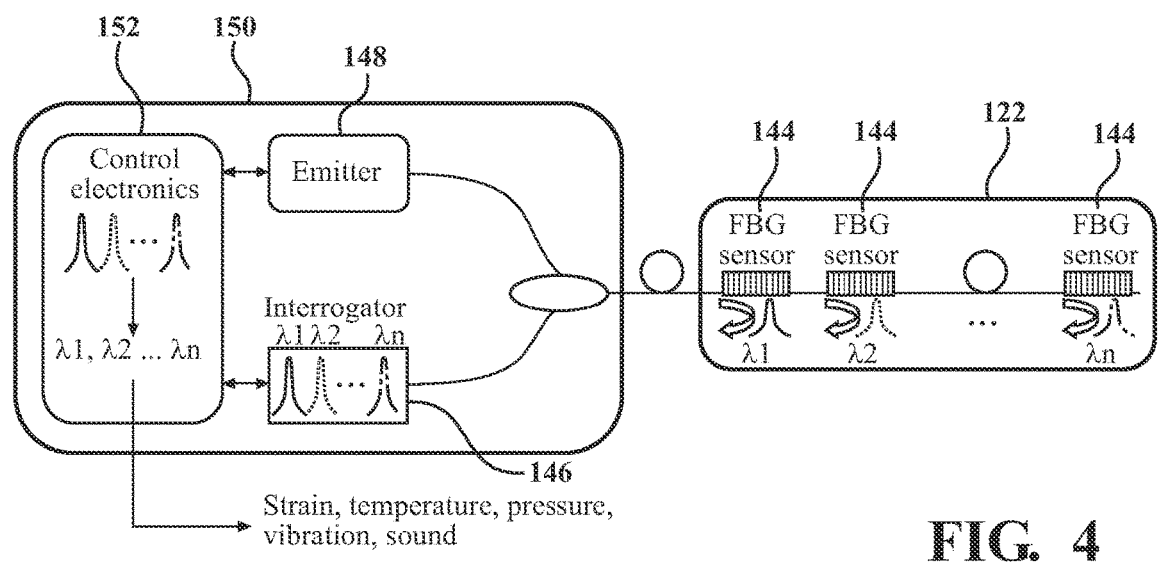
FIG. 4 is a schematic view of the optical fiber in communication with a control box according to one embodiment of the subject invention

A schematic view of the system 100 is shown in FIG. 4 in communication with one of the cores 130. Each of cores 130 has a plurality of grating sensors 144 disposed along a length thereof such that the system 100 is capable of determining a position and orientation of the body parts. The grating sensors 144 are inscribed integrally therein with the sensors 144 spaced along a length between the first and the second ends 126, 128. The number of grating sensors 144 can be selected based on the particular body part. For example, the optical fiber 122 can have from 7 to 25 sensors 144 disposed between the ends. Other embodiments can have up to 100 sensors 144 per core 130. The sensors 144 may be located near or adjacent joints, such as elbow, hip, shoulder, knee, or ankle joint as shown schematically in FIGS. 1 and 2. The sensors 144 may be located at the joint to accurately measure rotation and orientation of the joint. For certain body parts, the sensors 144 may be disposed equidistance from one another along the optical fiber 122 and about the body part. For other body parts, the sensors 144 may be more closely located to one another.

The system 100 includes an interrogator 146 communicating with the optical fiber 122 and an emitter 148 in communication with the optical fiber 122 for emitting a light having a predetermined band of wavelengths through the optical fiber 122 that is reflected by the sensors 144. The subject invention may enclose the interrogator 146 and the emitter 148 within a control box (shown generally at 150 in FIGS. 1 and 2). The control box 150 may also house a controller 152. A suitable control box 150, emitter 148, and interrogator 146 are disclosed in co-pending Application PCT/US19/14878, filed Jan. 24, 2019, which is incorporated herein by reference. As one example, the emitter 148 emits the light having a predetermined band wavelength that is from 50 to 450 nanometers. In one embodiment, the wavelength band can be in the range of 1510-1595 nanometers. In another embodiment, the wavelength band can be in the range of 1275-1345 nanometers. In still another embodiment, the wavelength band can be in the range of 780-850 nanometers. It is also possible that the wavelength band is suitable for red diode lasers. It is to be appreciated that these wavelength bands are exemplary and are not intended to limit the subject invention.

Figure 5:
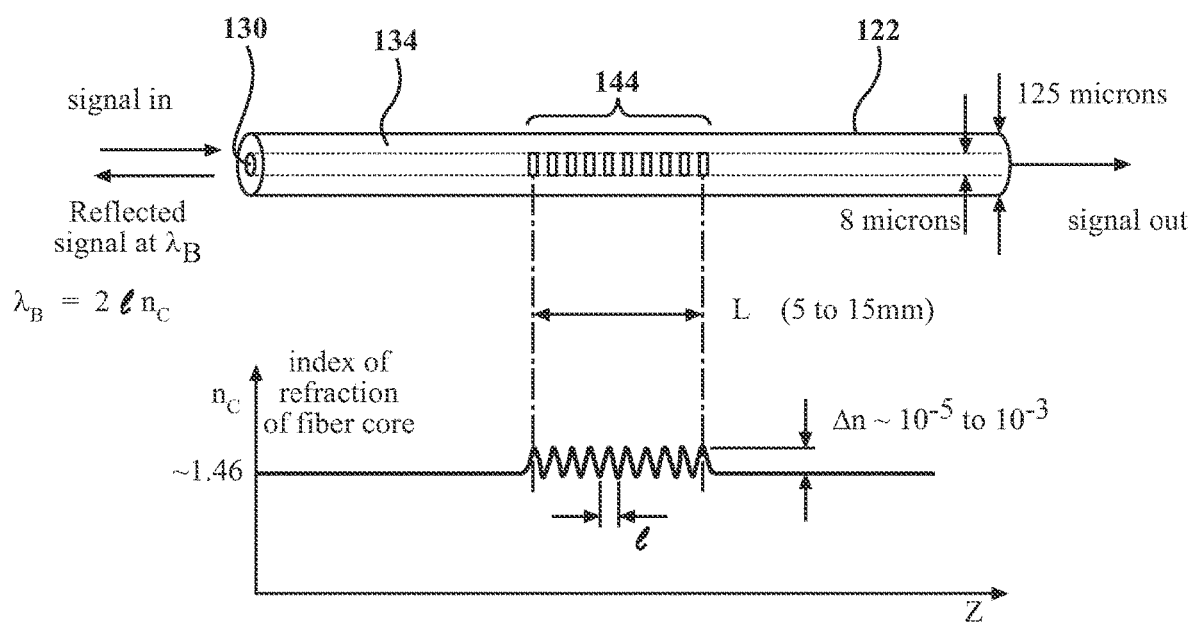
FIG. 5 is a schematic view of the optical fiber according to one embodiment of the subject invention.

Referring to FIG. 5, another schematic view of one of the optical fibers 122 and sensors 144 are shown having light directed down the core 130 that is reflected by the Fiber Bragg Grating as is understood by those of ordinary skill in the art. The sensor 144 has a length L and the light has a wavelength 1. It is to be appreciated by one of ordinary skill that the grating sensors 144 are generally a longitudinal variation in the refractive index of the core 130. The core 130 has an index of refraction, nc that is selected for the particular application. It is well known to one of ordinary skill in the optical fiber 122 arts to correlate the reflected light from the sensor 144 using the wavelength 1, length L, and index of refraction nc.

The optical fiber 122 may have a diameter of from 30 to 1000 microns. In one embodiment, the optical fiber 122 has a diameter of from 100 to 300 microns. Each of the cores 130 may have a same diameter or different diameters. In one embodiment of the system 100, each of the cores 130 has a diameter of from 2 to 900 microns. In another embodiment, each of the cores has a diameter of from 2-300 microns. Alternatively, the core 130 would typically have a diameter of less than 30 microns, and particularly from 5-20 microns. One preferred optical fiber 122 has a core 130 with a diameter of about 8 microns. The cladding material 134 is typically about 75-200 microns and particularly from 100-150 microns. In another embodiment, the optical fiber 122 has a diameter of from 100 to 200 microns. The optical fiber 122 can be sized for the particular body part. One common diameter for the optical fiber 122 is about 75-150 microns.

Figure 6:
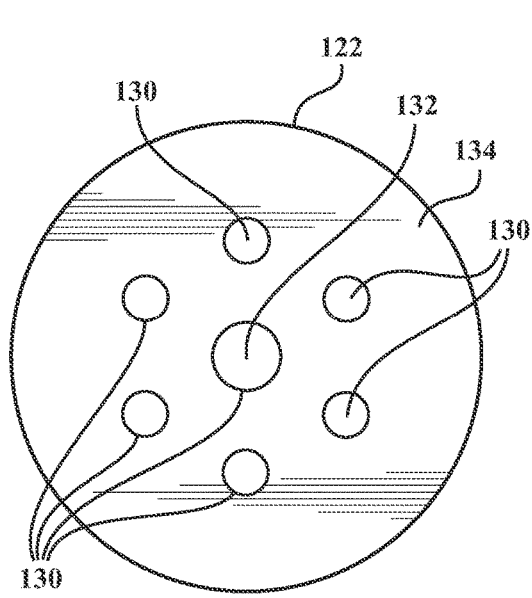
FIG. 6 is an end view of another embodiment of an optical fiber for use with the subject invention.
Figure 7:
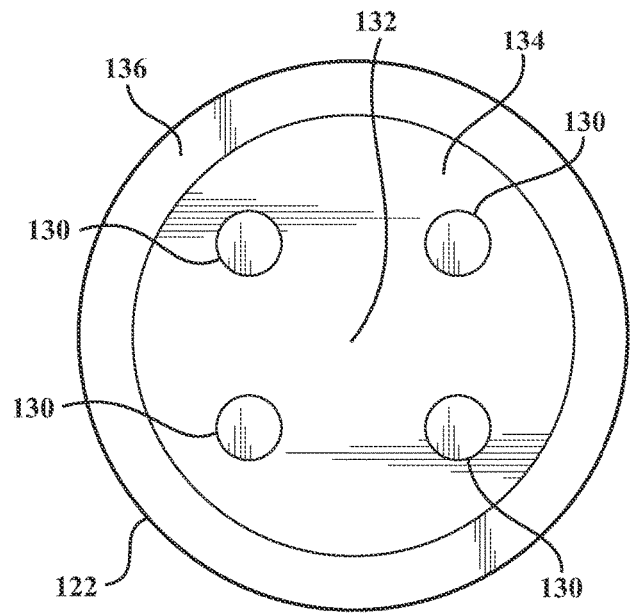
FIG. 7 is an end view of still another embodiment of an optical fiber for use with the subject invention.
Figure 8:
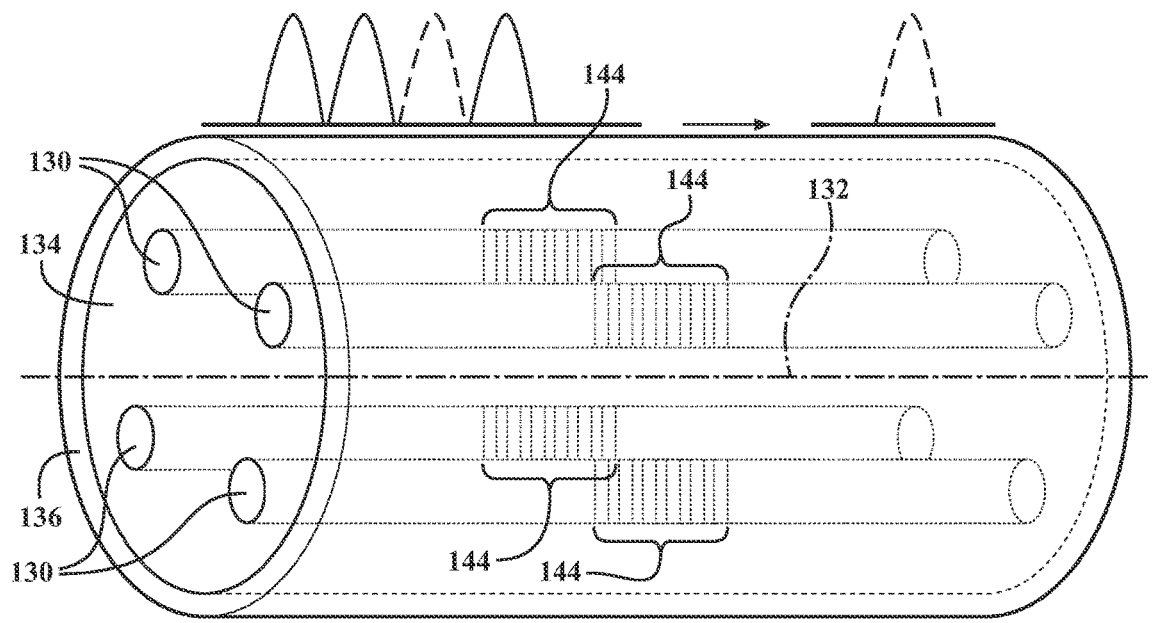
FIG. 8 is a perspective view of the fiber bundle shown in FIG. 7.

Referring to FIG. 6, another embodiment of the optical fiber 122 is shown having seven cores 130 and the cladding material 134. In this embodiment, one of the cores 130 extends along the fiber axis 132 of the optical fiber 122 and the remaining six cores 130 are spaced equally about the fiber axis 132. Further, the optical fiber 122 may include the coating material 136, which is not shown. FIG. 7 shows another embodiment of the optical fiber 122 that has four cores 130 spaced from one another and the cores 130 extend parallel to each other along the optical fiber 122. The cores 130 are shown having a single cladding material 134 and coating material 136 surrounding the four cores 130. FIG. 8 is a perspective view of the optical fiber 122 shown in FIG. 7 and illustrates the light transmitted through one of the cores 130 as waves. In this example, three of the waves are reflected by the sensor 144 and one wave would continue. The optical fiber 122 has a plurality of grating sensors 144 positioned along each of the cores 130 of the optical fiber 122 which may reflect the other waves. The sensors 144 can be located adjacent to or offset from one another. The spacing of the grating sensors 144 determine the particular wavelength that will be reflected by the grating sensor 144. It is well known that each grating sensor 144 has its own period and thereby its own unique reflection wavelength, so that each sensor can be distinguished by the detected reflection.

As the optical fiber 122 bends and conforms to the shape of the body parts, the sensors 144 change from stress or strain and can provide bend and shape measurement when multiple cores 130 are interrogated as described above. The same fibers would enable tracking of the precise shape, position and movements of the ATD 102 in real time. The detection of strain could be provided by Fiber Bragg Gratings (FBGs), Brillouin scattering, Rayleigh scattering, interferometers, or any other optical technique. Although the grating sensors 144 are described as integral with the optical fiber 122, it is to be understood by one of ordinary skill in the art that optical time domain reflectometry (OTDR) could be used with Brillouin or Rayleigh scattering to achieve the subject invention by using a time of pulse to determine the location of the strain. One advantage of having the cores 130 placed side by side is that it can be used for bend measurement. Referring back to FIG. 6, the centrally located core 130 can be used for measurement or compensation of total strain or temperature because it is along the fiber axis 132 of the fiber 122.

Figure 9:
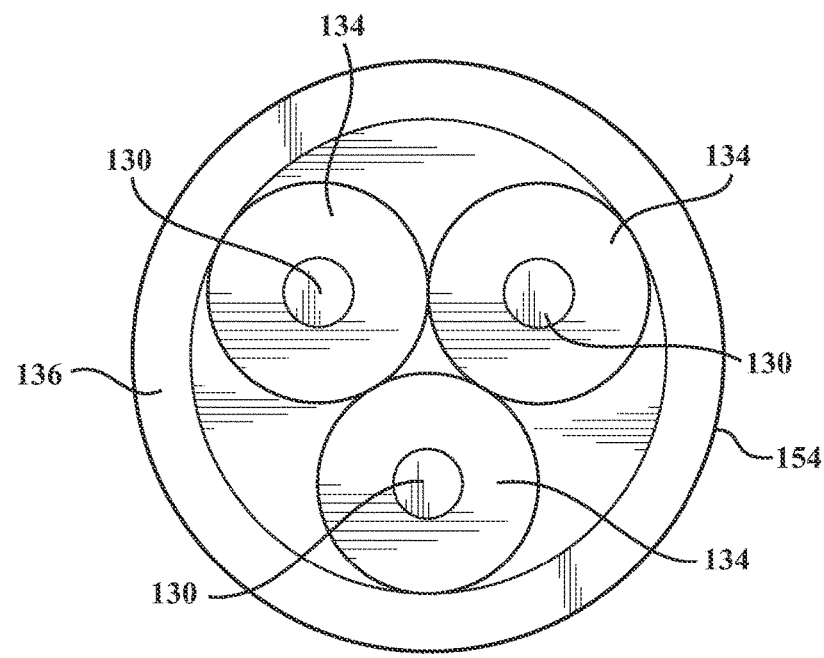
FIG. 9 is an end view of one embodiment of a fiber bundle of collocated optical fibers for use in the subject invention.
Figure 10:
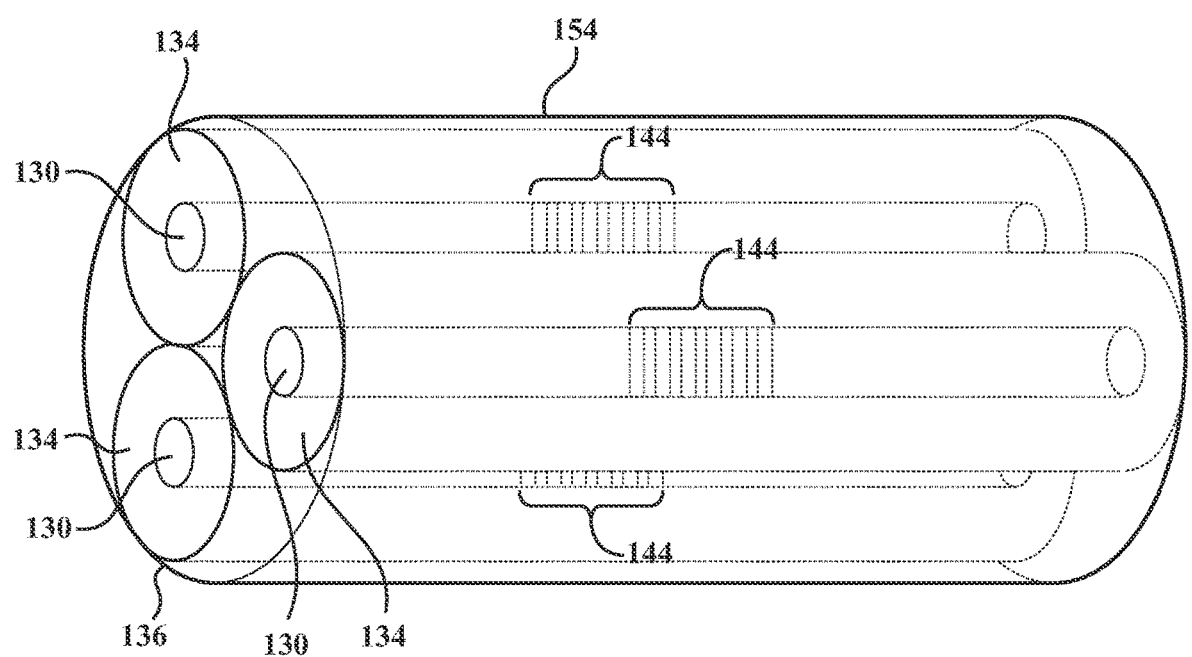
FIG. 10 is a perspective view of the fiber bundle shown in FIG. 9.

With reference to FIG. 9, another embodiment of at least one of the optical fibers 122 is a fiber bundle 154 of collocated optical fibers 122. The fiber bundle 154 includes three collocated optical fibers 122, each having the core 130 and the cladding 134. FIG. 10 is a perspective view of the optical fiber 122 shown in FIG. 9. The bundle can contain multiple collocated fibers or different sections of the same fiber. The collocated fiber can have a single core 130 or multiple cores 130. The collocated optical fibers 122 may be connected to each other by the cladding 134 or any other layers that are included with the optical fiber 122. A suitable adhesive may be used to attach the collocated optical fibers 122 together. Alternatively, the collocated optical fibers 122 may slide freely next to each other.

The subject invention allows shape information to be extracted from differential strain measurements from the different cores 130. In one embodiment, the optical fiber 122 has a length that extends through the body parts of the ATD 102. Preferably, the length is sufficient that one single optical fiber 122 can extend through the head, neck, arm, thorax, pelvis and upper and lower leg assemblies. Alternatively, each of the body parts can receive its own optical fiber 122. For example, the shape sensing can be used to detect the position of each limb, head, body or organs in relation to the spine or in relation to the surrounding environment which could be a car or a seat.

The sensing system 100 can be attached to parts of the ATDs 102 such as neck, spine, joints, internal organs, bones, ribs or any part and the sensing system 100 can be used for a method for repeatably positioning the anthropomorphic test device 102. Referring back to FIG. 1, the optical fiber 122 is disposed throughout a plurality of body parts forming the anthropomorphic test device to monitor the shape of the ATD 102 by sensing different parts such as torso, limbs and head. The ATD 102 is positioned in an initial position and orientation of the body parts and an initial instance of a light is emitted through the cores 130 of the optical fibers 122. An initial reflected light of the initial instance of the light, or first reflection, from the sensors 144 that corresponds to the initial position and orientation is detected with the interrogator 146, which communicates with the controller 152. Next, the ATD 102 is moved, such as by being subjected to a sudden impact causing the body parts to move from the initial position and orientation. This can be as a result of performing a collision test or an impact test. The ATD 102 could also be moved from one testing fixture to another. Alternatively, the ATD 102 could have been inadvertently moved during setup. The ATD 102 is repositioned with the optical fiber 122 disposed thereabout. The optical fiber 122 may have remained on the ATD 102 during the test or it could be repositioned after the test. For example, the ATD 102 could be initially positioned with an optical fiber vest that is removed for a test and then reinstalled for the next test.

A second instance of a light is emitted through the cores of the optical fibers and a second reflected light, or a second reflection, of the second instance of the light from the sensors is detected. The ATD 102 is continued to be repositioned and reoriented until the second reflection correlates with the initial reflection such that the position and orientation corresponds to the initial position and orientation. The controller 152 outputs the display of the reflections of the first and second instance of light such that the ATD 102 can be adjusted until the second reflection adequately compares to the first reflection as would be acceptable to those of ordinary skill in the art. The output could be viewed manually or by the controller 152. The correlation between the first and the second reflection does not have to be exact, but the closer the correlation, the better the likelihood for repeatable test results from the subsequent test. In many existing systems, the positioning of the ATD 102 is performed manually so there is variation between positions and orientations that produce different results from the same test. Therefore, the subject invention seeks to overcomes this deficiency by knowing the precise position and ordination at the beginning which can be repeated for each subsequent test.

Thus, the subject invention allows for the precise positioning of the ATD 102 prior to subjecting the ATD 102 to a test or any movements. Once a starting position and orientation of the ATD 102 is known or registered, the ATD 102 can be repositioned in the same position and orientation for subsequent test. The subject invention also allows for the detection of bending of joints, such as elbows, knees, or neck, before, during and after a test. Each joint may include the sensor 144 positioned adjacent thereto such that each sensor 144 provides its unique reflection that includes frequency, period, or peak. If the subsequent reflection for each does not have the same frequency, period, or peak, the joint can be further positioned until properly aligned. The ability to repeatedly place the ATD 102 in the correct or same position before the test and for subsequent tests considerably improves the test results. Further, being able to reposition and reorient the ATD 102 in the same initial position ensures accuracy of various tests which can be repeated multiple times.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method for repeatably positioning an anthropomorphic test device within a test fixture, said method comprising the steps of:

disposing at least one optical fiber throughout a plurality of body parts forming the anthropomorphic test device, the optical fiber having a plurality of cores extending between a first end and a second end with each of the cores being in a spaced and parallel relationship with one another between the first and the second ends and each of the cores having a plurality of grating sensors inscribed integrally therein with the sensors spaced along a length between the first and the second ends;

positioning the anthropomorphic test device within the test fixture in an initial position and orientation of the body parts;

emitting an initial instance of a light through the cores of the optical fibers;

detecting an initial reflected light of the initial instance of the light from the sensors that corresponds to the initial position and orientation;

subjecting the anthropomorphic test device to a sudden impact causing the body parts to move from the initial position and orientation;

repositioning the anthropomorphic test device within the test fixture with the at least one optical fiber disposed thereabout;

emitting a second instance of a light through the cores of the optical fibers;

detecting a second reflected light of the second instance of the light from the sensors;

continuing to reposition and reorient the anthropomorphic test device until the second reflection correlates with the initial reflection such that the position and orientation of the anthropomorphic test device corresponds to the initial position and orientation.

2. A method as set forth in claim 1 wherein the step of disposing at least one optical fiber throughout a plurality of body parts is further defined as disposing at least one grating sensor of the optical fiber adjacent at least one joint of the plurality of body parts.

3. A method as set forth in claim 1 wherein the step of disposing at least one optical fiber throughout a plurality of body parts is further defined as disposing a single optical fiber throughout the plurality of body parts.

4. A method as set forth in claim 1 wherein the optical fiber has a longitudinally extending fiber axis with one of the cores located along the axis.

5. A method as set forth in claim 4 wherein the at least one optical fiber further comprises a fiber bundle of collocated optical fibers adjacent one another with each of the collocated optical fibers having at least one core.

6. A method as set forth in claim 1 wherein each of the cores has a diameter of from 5 to 20 microns.

7. A method as set forth in claim 1 wherein the plurality of cores includes at least three cores.

8. A method as set forth in claim 1 wherein the optical fiber is embedded within the body part.

9. A method as set forth in claim 1 wherein the optical fiber is surface mounted to the body part.

10. A method as set forth in claim 1 wherein each of the cores have a same diameter.

11. A method as set forth in claim 1 wherein at least one of the cores has a different diameter of the other cores.

\* \* \* \* \*